United States Patent
Bickham

(10) Patent No.: US 10,837,804 B2
(45) Date of Patent: Nov. 17, 2020

(54) ENHANCED MICROBEND SENSOR

(71) Applicant: CORNING INCORPORATED, Corning, NY (US)

(72) Inventor: Scott Robertson Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/432,213

(22) Filed: Jun. 5, 2019

(65) Prior Publication Data
US 2020/0003589 A1 Jan. 2, 2020

Related U.S. Application Data

(60) Provisional application No. 62/691,340, filed on Jun. 28, 2018.

(51) Int. Cl.
*G01D 5/353* (2006.01)
*G02B 6/028* (2006.01)
*G02B 6/12* (2006.01)

(52) U.S. Cl.
CPC ....... *G01D 5/35374* (2013.01); *G02B 6/0288* (2013.01); *G02B 6/12* (2013.01); *G02B 2006/1209* (2013.01); *G02B 2006/12138* (2013.01)

(58) Field of Classification Search
CPC .......... G01D 5/35374; G01D 5/35351; G01D 5/3538; G02B 6/0288; G02B 6/12; G02B 2006/1209; G02B 2006/12138
USPC ...................... 385/12–13, 123–128
See application file for complete search history.

(56) References Cited

U.S. PATENT DOCUMENTS

| 6,429,421 | B1 | 8/2002 | Meller et al. |
| 6,711,330 | B1 * | 3/2004 | Donlagic ............. G02B 6/0288 385/123 |
| 9,541,425 | B2 | 1/2017 | Farhadiroushan et al. |
| 9,581,489 | B2 | 2/2017 | Skinner |

(Continued)

FOREIGN PATENT DOCUMENTS

| WO | 03054603 A1 | 7/2003 |
| WO | 2013003016 A1 | 1/2013 |
| WO | 2017040105 A1 | 3/2017 |

OTHER PUBLICATIONS

Bickham et al; "Multimode Fiber for High-Density Optical Interconnects"; Proc. SPIE 10109, Optical Interconnects XVII, (2017); pp. 101090S-1-101090S-8.

(Continued)

*Primary Examiner* — Michael P Mooney
(74) *Attorney, Agent, or Firm* — Smit Kapadia

(57) ABSTRACT

An optical fiber sensor includes a first single mode fiber, a second single mode fiber, and a multimode fiber positioned between, and coupled to, the first single mode fiber and the second single mode fiber. The multimode fiber includes a graded-index core with an outer diameter between about 35 μm and about 45 μm. A numerical aperture of the core is between about 0.15 and about 0.25. The multimode fiber includes a cladding with an outer diameter between about 70 μm and about 90 μm. A coupling strength of an $LP_{01}$ mode of the first single mode fiber to each of an $LP_{02}$ mode and an $LP_{03}$ mode of the multimode fiber is at least about 0.25.

20 Claims, 3 Drawing Sheets

(56) References Cited

U.S. PATENT DOCUMENTS

2009/0260501 A1    10/2009    Kashyap
2013/0169445 A1    7/2013    Carralero et al.

OTHER PUBLICATIONS

Donlagic et al; "Fiber-Optic Microbend Sensor Structure"; Optics Letters, vol. 22, No. 11; pp. 837-839 (1997).

Duncan et al; "OFDR-Based Distributed Sending and Fault Detection for Single- and Multi-Mode Avionics Fiber-Optics"; (2009); Luna Technologies, 6 Pages.

Lagakos et al; "Microbend Fiber-Optic Sensor"; Applied Optics, vol. 26, No. 11, (1987) pp. 2171-2180.

Lagakos et al; "Multimode Optical Fiber Displacement Sensor"; Applied Optics; vol. 20, No. 2, (1981); pp. 167-168.

Lenahan; "Calculation of Modes in an Optical Fiber Using the Finite Element Method and Eispack," Bell System Technical Journal, V 62, N 9, Pt.1, 1983, p. 2663-94.

Liu et al; "Low-Cost High-Sensitivity Strain and Temperature Sensing Using Graded-Index Multimode Fibers"; Applied Optics; vol. 46, No. 13; (2007) pp. 2516-2519.

Olshansky; "Distortion Losses in Cabled Optical Fibers"; Applied Optics; vol. 14, No. 1; (1975); pp. 20-21.

Silva et al; "Temperature and Strain-Independent Curvature Sensor Based on a Singlemode/Multimode Fiber Optic Structure"; Meas. Sci. Technol. 22, (2011); 6 Pages.

Taue et al; "Experimental Analysis of Optical Fiber Multimode Interference Structure and Its Application to Refractive Index Measurement"; Japanese Journal of Applied Physics, 51 (2012); pp. 04DG14-1-04DG14-4.

Xue et al; "Single-Mode-Mulitmode Fiber Structure Based Sensor for Simultaneous Measurement of Refractive Index and Temperature"; IEEE Sensors Journal, vol. 13, No. 11 (2013) pp. 4220-4223.

Gong et al. "All-fiber curvature sensor based on multimode interference", IEEE Photonics Technology Letters, 23 (11) 2011, pp. 679-681.

International Search Report and Written Opinion of the European Searching Authority; PCT/US2019/037426 dated Sep. 6, 2019, 10 Pgs.

\* cited by examiner

ENHANCED MICROBEND SENSOR

This application claims the benefit of priority to U.S. Provisional Application Ser. No. 62/691,340 filed on Jun. 28, 2018, the content of which is relied upon and incorporated herein by reference in its entirety.

FIELD OF THE DISCLOSURE

The present disclosure relates to optical fiber sensors. More specifically, the present disclosure relates to optical fiber sensors with enhanced microbend sensitivity.

BACKGROUND

Optical fiber sensors are often deployed in environments where electrical sensors are not practical due to the presence of electromagnetic fields or corrosive chemicals. The optical fiber sensors may be utilized to measure changes in thermal or mechanical properties in the environments where they are deployed. In some of these optical fiber sensors, an active monitoring unit is employed that transmits light from a light source into a passive fiber sensor. The light source is often either a laser with a tunable output wavelength or a broadband light source. Backscattered, transmitted, or reflected light is then collected by a detector in the monitoring unit and processed or converted into data that provides information relating to strain and/or temperature variations experienced by the optical fiber sensor in the environment where the fiber sensor is deployed.

SUMMARY OF THE DISCLOSURE

According to one aspect of the present disclosure, an optical fiber sensor includes a first single mode fiber, a second single mode fiber, and a multimode fiber positioned between, and coupled to, the first single mode fiber and the second single mode fiber. The multimode fiber includes a graded-index core with an outer diameter between about 35 µm and about 45 µm. A numerical aperture of the core is between about 0.15 and about 0.25. The multimode fiber includes a cladding with an outer diameter between about 70 µm and about 90 µm. A coupling strength of an $LP_{01}$ mode of the first single mode fiber to each of an $LP_{02}$ mode and an $LP_{03}$ mode of the multimode fiber is at least about 0.25.

According to another aspect of the present disclosure, an optical fiber sensor includes a first single mode fiber, a second single mode fiber, and a multimode fiber positioned between, and coupled to, the first single mode fiber and the second single mode fiber. The multimode fiber includes a graded-index core with an outer radius of about 20 µm. A numerical aperture of the core is about 0.20 at a wavelength of 1550 nm. A cladding of the multimode fiber has an outer radius of about 40 µm. An $LP_{01}$ mode of the first single mode fiber is closely matched to a central positive lobe of an $LP_{02}$ mode of the multimode fiber such that a coupling strength of the $LP_{01}$ mode of the first single mode fiber to each of an $LP_{02}$ mode and an $LP_{03}$ mode of the multimode fiber is at least about 0.25 at a wavelength of 1550 nm.

In various examples of the foregoing aspects, the coupling strength of the $LP_{01}$ mode of the first single mode fiber to the $LP_{02}$ mode of the multimode fiber is at least about 0.35. The coupling strength of the $LP_{01}$ mode of the first single mode fiber to the $LP_{03}$ mode of the multimode fiber is at least about 0.28. The $LP_{02}$ and the $LP_{03}$ modes of the multimode fiber coherently interfere as light propagates through the multimode fiber. A coupling strength of an $LP_{01}$ mode of the second single mode fiber to the $LP_{02}$ mode of the multimode fiber is at least about 0.40. The coupling strength of the $LP_{01}$ mode of the first single mode fiber to the $LP_{03}$ mode of the multimode fiber is at least about 0.30. The coupling strength of the $LP_{01}$ mode of the first single mode fiber to an $LP_{01}$ mode of the multimode fiber is less than about 0.90. The coupling strength of the $LP_{01}$ mode of the first single mode fiber to an $LP_{01}$ mode of the multimode fiber is less than about 0.85. The coupling strength of the $LP_{01}$ mode of the first single mode fiber to the $LP_{03}$ mode of the multimode fiber is at least about 0.30. The first single mode fiber has a core having an outer diameter between about 4 µm and about 8 µm and a maximum relative refractive index between about 0.4% and about 1.2%, and a cladding diameter between about 70 µm and about 90 µm. The second single mode fiber has a core having an outer diameter between about 4 µm and about 8 µm and a maximum relative refractive index between about 0.4% and about 1.2%, and a cladding diameter between about 70 µm and about 90 µm.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
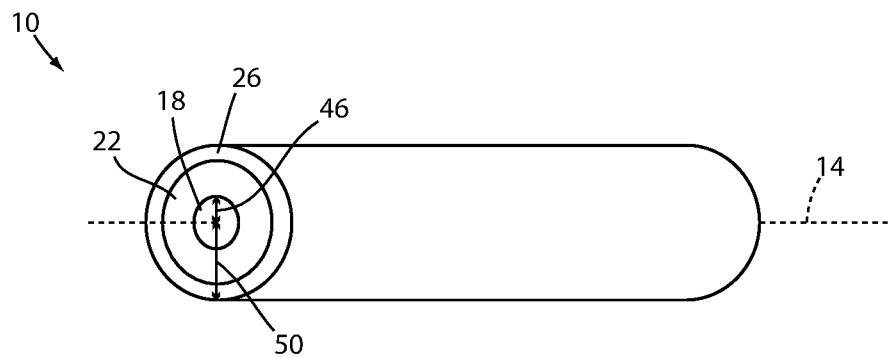
FIG. 1 is a front elevated view of a section of an optical fiber, illustrating a core, a cladding, and a coating.

Additional features and advantages will be set forth in the detailed description that follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The abbreviation "µm" stands for micron or micrometer.

The "relative refractive index" as used herein is defined as:

$$\Delta\% = 100\frac{n^2(r) - n_{cl}^2}{2n^2(r)}$$

where n(r) is the refractive index of the fiber at a radial distance, r, from the fiber's centerline, unless otherwise specified, and $n_{cl}$ is the index of the outer cladding. When the outer cladding is essentially pure silica, $n_{cl}$=1.444 at a wavelength of 1550 nm. As used herein, the relative refractive index percent (also referred to herein as the relative refractive index) is represented by $\Delta$ (or "delta"), $\Delta$ % (or "delta %"), or %, all of which are used interchangeably herein, and its values are given in units of percent or %, unless otherwise specified. Relative refractive index may also be expressed as $\Delta(r)$ or $\Delta(r)$ %.

The refractive index profile for the core of an optical fiber may often be represented by $$\Delta\% = \Delta_0\left[1 - \left(\frac{r}{a}\right)^\alpha\right]$$

where $\Delta_0$ is the maximum relative refractive index of the core, a, is the radius of the core and $\alpha$, or alpha, is a curvature parameter. Cores that have refractive index profiles with alpha values less than about 5 are referred to as graded-index cores, cores with refractive index profiles with alpha values greater than about 20 are referred to as step-index cores, and cores with refractive index profiles with alpha values between about 5 and about 20 are referred to as rounded step-index cores.

The numerical aperture (NA) of an optical fiber is related to the maximum relative refractive index of the core, $\Delta_0$, by:

$$NA = n_{cl}\sqrt{\frac{2\Delta_0}{(1-2\Delta_0)}}$$

The effective group index $\beta_{mn}$ and electric field $E_{mn}$ of each of the linearly polarized ($LP_{mn}$) modes supported by a given single mode or multimode fiber can be found numerically (e.g. T. A. Lenahan, "Calculation of modes in an optical fiber using the finite element method and EISPACK," Bell System Technical Journal, v 62, n 9, pt. 1, November 1983, 2663-94), where m and n designate azimuthal and radial indices, respectively. The electric field $E_{mn}$ is normalized such that:

$$\int_0^\infty E_{mn}^2(r)r\,dr = 1$$

With reference to FIG. 1, a fiber 10 is generically shown and may be a single mode fiber (SMF) or a multimode fiber (MMF). The fiber 10 has an outer diameter and a centerline 14. The fiber 10 is cylindrically symmetric about the centerline 14. The fiber 10 typically is provided with a core 18, a cladding 22, and a coating 26. In some examples of the present disclosure, the fiber 10 may be provided with the core 18 and the cladding 22 while omitting the coating 26.

Figure 2:
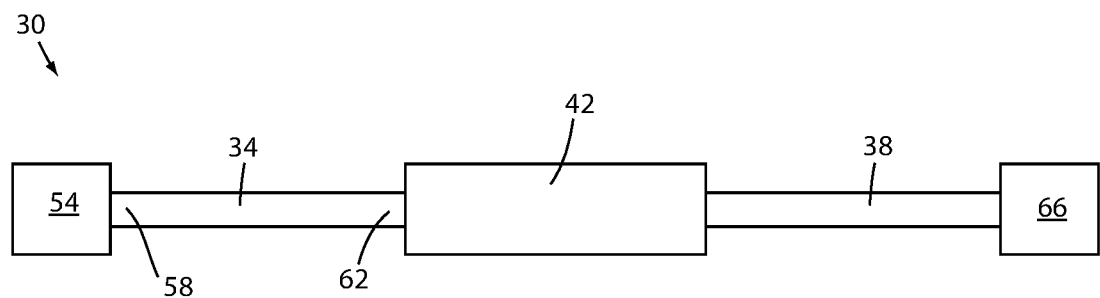
FIG. 2 is a schematic representation of an optical fiber sensor, according to one embodiment.

Referring now to FIGS. 1 and 2, an optical fiber sensor 30 is schematically shown. In the depicted example, the optical fiber sensor 30 includes a first single mode fiber 34, a second single mode fiber 38, and a multimode fiber 42. The multimode fiber 42 is positioned between the first single mode fiber 34 and the second single mode fiber 38. The multimode fiber 42 may be coupled to the first and second single mode fibers 34, 38 by any method known to one skilled in the art, such as splicing or with coupling fittings. In some examples, the multimode fiber 42 is provided with a graded-index core. The core of the multimode fiber 42 may have an outer radius 46 that is at least about 10 µm, at least about 15 µm, at least about 20 µm, at least about 25 µm, at least about 30 µm, and/or combinations or ranges thereof. One of skill in the art will recognize that when radii are discussed, diameters may be alternatively discussed by doubling the radius being discussed without departing from the concepts disclosed herein. For example, the core of the multimode fiber 42 can have a diameter of between about 35 µm and about 45 µm. The core of the multimode fiber 42 may have a numerical aperture at a wavelength of 1550 nm that is about 0.14, about 0.16, about 0.18, about 0.20, about 0.22, about 0.24, about 0.26, about 0.28, about 0.30, about 0.32, and/or combinations or ranges thereof. The graded-index core of the multimode fiber 42 may have a curvature parameter, alpha, that is about 1.8, about 1.9, about 2.0, about 2.1, about 2.2, and/or combinations or ranges thereof. The cladding 22 may have an outer radius 50 that is at least about 30 µm, at least about 35 µm, at least about 40 µm, at least about 45 µm, at least about 50 µm, and/or combinations or ranges thereof. The cladding 22 may have an outer radius 50 that is less than about 65 µm, less than about 55 µm, less than about 45 µm, less than about 40 µm, and/or combinations or ranges thereof. For example, an outer diameter of the cladding 22 can be between about 70 µm and about 90 µm.

In the present disclosure, a concatenated span of optical fibers is presented that can be used for single-point or distributed sensing. The concatenated span of optical fibers includes the first single mode fiber 34, the second single mode fiber 38, and the multimode fiber 42. A light source 54 is coupled to a first end 58 of the first single mode fiber 34 to direct light into the first end 58 of the first single mode fiber 34. The first single mode fiber 34 may be referred to as an input fiber and propagates light from the light source 54 to the multimode fiber 42. The multimode fiber 42 is coupled to a second end 62 of the first single mode fiber 34. The light that propagates through the first single mode fiber 34 enters into the multimode fiber 42 and excites at least two discrete modes in the multimode fiber 42. For example, the light traveling through the first single mode fiber 34 may excite the fundamental mode, $LP_{01}$, of the first single mode fiber 34, and upon entering into the multimode fiber 42, the light may excite two or more modes in the multimode fiber 42. In one example, the fundamental mode of the single mode fiber 34 excites the $LP_{01}$ mode and one or more higher order modes in the multimode fiber 42, such as the $LP_{02}$ and $LP_{03}$ modes of the multimode fiber 42. The multimode fiber 42 is configured as a microbend sensor fiber (MSF). Changes in a degree of interference between the excited modes in the multimode fiber 42 result in fluctuations in an amount of power that is coupled into the fundamental $LP_{01}$ mode of the second single mode fiber 38. The second single mode fiber 38 may also be referred to as an output fiber.

In general, presented herein is a microbend sensing fiber, such as the multimode fiber 42, that has enhanced microbend sensitivity. Additionally, the coupling of the multimode fiber 42 to the first single mode fiber 34 and the second single mode fiber 38 has been improved or optimized. The resulting microbend sensing fiber is an extremely sensitive probe of changes in strain, temperature, and/or refractive index imparted on the optical fiber sensor 30 by the environment in which the optical fiber sensor 30 is deployed. In various examples, the optical fiber sensor 30 may be utilized in conjunction with optical frequency domain reflectometry (OFDR) techniques, which increases a spatial resolution of the optical fiber sensor 30 to fractions of a meter and enables locating microbend-induced perturbations in the optical fiber sensor 30 more precisely than when optical time domain reflectometry (OTDR) techniques are employed. In one example, the optical fiber sensor 30 may be deployed in building structures and utilized to locate cracks, breaks, and/or stresses within the structure with greater precision. In such an example, the optical fiber sensor 30 is utilized as a structural monitor where perturbations in the deployment environment induce elevated power losses in the optical fiber sensor 30. The specific locations of the elevated power losses can then be pinpointed using OFDR or OTDR.

The optical fiber sensor 30 may be referred to as a single mode-multimode-single mode (SMS) fiber. As explained above, in one example, light is launched into an input single mode fiber (e.g., the first single mode fiber 34), the light then propagates through the input single mode fiber and couples into the microbend sensing fiber (e.g., the multimode fiber 42), after the light propagates along the microbend sensing fiber, then light couples into an output single mode fiber (e.g., the second single mode fiber 38) where the light propagates to a detector 66 (e.g., OFDR or OTDR equipment). The optical fiber sensor 30 of the present disclosure may be incorporated into an optical system that includes a light source, such as a laser or broadband optical source, which excites the fundamental $LP_{01}$ mode of the first single mode fiber 34. In various examples, the first single mode fiber 34 may be configured to sacrifice a coupling strength between the excited fundamental $LP_{01}$ mode of the first single mode fiber 34 and the $LP_{01}$ mode of the multimode fiber 42 in favor of a greater coupling strength between the excited fundamental $LP_{01}$ mode of the first single mode fiber 34 and the higher order modes (e.g., $LP_{02}$ and/or $LP_{03}$) of the multimode fiber 42. The excited fundamental $LP_{01}$ mode of the first single mode fiber 34 may excite two or more modes (e.g., the $LP_{01}$ mode and at least one higher-order mode) of the multimode fiber 42. The two or more modes that are excited in the multimode fiber 42 (e.g., the $LP_{01}$ mode and the $LP_{02}$ mode) may coherently interfere with one another as the excited modes propagate through the multimode fiber 42. This interference changes the level of power that is coupled into the $LP_{01}$ mode of the second single mode fiber 38 and ultimately detected by the detector 66. The first and second single mode fibers 34, 38 may be identically configured such that what is discussed herein relative to the first single mode fiber 34 may likewise apply to the second single mode fiber 38. In various examples, the detector 66 may be an optical spectrum analyzer (OSA). Accordingly, there is a baseline level of power loss present in the optical fiber sensor 30 that increases when the environment where the optical fiber sensor 30 is deployed induces elevated attenuation due to microbending or macrobending.

The first single mode fiber 34, the second single mode fiber 38, and the multimode fiber 42 have been co-optimized with one another to provide the enhanced microbend sensor discussed herein. An advantage of the present disclosure is that a coupling strength from the first single mode fiber 34 into the higher order modes of the multimode fiber 42 has been improved and prioritized. Additionally, the multimode fiber 42 has been configured or manufactured to enhance the multimode fibers 42 sensitivity to microbending perturbations. Microbend-induced loss, in dB, for the multimode fiber 42 with a core diameter, a, and a cladding diameter, b, may scale as shown in Equation 1, where NA is the numerical aperture of the multimode fiber 42.

$$\gamma \propto \frac{a^4}{b^6(NA)^6} \qquad (1)$$

A comparative multimode fiber that meets the standards set forth for an OM3 fiber typically has a core diameter of about 50 μm, a cladding diameter of about 125 μm, and a numerical aperture of 0.20, which result in relatively low microbend sensitivity. While these parameters may make this comparative multimode fiber suitable for telecommunication applications, such a comparative multimode fiber alone is not well suited for use as a microbend sensing fiber. In an attempt to utilize alternative comparative multimode fibers, a multimode fiber may be chosen that has a relatively small cladding diameter. As a specific example, Equation 1 predicts that decreasing the cladding diameter from 125 μm to 80 μm increases the microbend-induced loss by a factor of about 14.5. However, in choosing such an alternative comparative multimode fiber, another issue arises. Specifically, the higher order modes supported by the cores of such an alternative comparative multimode fiber generally do not couple well (e.g., weak coupling strengths) to most input fibers, such as the first single mode fiber 34. Accordingly, the core 18 of the multimode fiber 42 in the present disclosure has been designed to support higher order modes that couple well (e.g., greater coupling strength) with input fibers, such as the first single mode fiber 34.

In one specific example, the core 18 of the multimode fiber 42 is provided with a graded-index core that has a numerical aperture of 0.20, a core diameter of 40 μm, and a cladding diameter of 80 μm. The resultant multimode fiber 42 has an enhanced or elevated microbend sensitivity and sufficiently low attenuation to enable deployment in lengths of up to several kilometers.

If only the two lowest-order modes in the multimode fiber 42 of the optical fiber sensor 30 are considered (e.g., the $LP_{01}$ and $LP_{02}$ modes), then the intensity, I, received by the detector 66 (e.g., the optical sensor analyzer) is given by Equation 2.

$$I = \left[ I_1 + I_2 + 2\sqrt{I_1 I_2} \cos \frac{2\pi \Delta n_g L}{\lambda} \right] \quad (2)$$

In Equation 2, $I_1$ and $I_2$ are the intensities in the first order mode and the second order mode, respectively, L is the length of the multimode fiber 42, λ is the wavelength of light, and $\Delta n_g$ is the difference between the effective group indices of the two lowest order modes. A wavelength spacing of an interference spectrum that is generated between the propagating modes is given by Equation 3.

$$\Delta \lambda = \frac{\lambda^2}{L(\Delta n_g)} \quad (3)$$

In Equation 3, the wavelength spacing, Δλ, is inversely proportional to the product of the length, L, of the multimode fiber 42 and the difference between the effective group indices of the two lowest order modes, $\Delta n_g$. The nominal value of $\Delta n_g$ is determined by the core parameters of the multimode fiber 42 that is utilized. Accordingly, the length, L, of the multimode fiber 42 can be adjusted to tune Δλ to practical values that can be measured by the detector 66.

A power distribution of the interference spectrum depends on the relative intensities in the two propagating modes. Increasing a ratio of $I_2$ to $I_1$ such that the ratio is closer to, or even approaches, unity (i.e., $I_2 \approx I_1$) increases the amplitude, $2\sqrt{I_1 I_2}$, of the interference term in Equation 2 and enhances the response of the optical fiber sensor 30. When the optical fiber sensor 30 is subjected to environmental changes (e.g., strain or temperature changes), the product of $\Delta n_g$ and L changes. The change in the product of $\Delta n_g$ and L results in a change in the wavelength spacing of the interference spectrum, which may be given by Equation 4. In Equation 4, the applied strain, ε, is given by $$\varepsilon = \frac{dL}{L}.$$

$$\frac{\Delta \lambda}{\lambda} \approx \left[ \frac{1}{\Delta n_g} \frac{\partial (\Delta n_g)}{\partial T} + \frac{1}{L} \frac{\partial L}{\partial T} \right] \Delta T + \left[ 1 + \frac{1}{\Delta n_g} \frac{\partial (n_g)}{\partial \varepsilon} \right] \varepsilon \quad (4)$$

The first single mode fiber 34 is configured to guide only the fundamental $LP_{01}$ mode, which has a cylindrical symmetry and a Gaussian or near-Gaussian intensity-versus-radius profile. When the cores 18 of the first single mode fiber 34 and the multimode fiber 42 are well aligned (i.e., without significant lateral offset) and the numerical apertures (NA) of the first single mode fiber 34 and the multimode fiber 42 are matched, then the $LP_{01}$ mode of the first single mode fiber 34 only excites the cylindrically symmetric $LP_{0m}$ modes of the multimode fiber 42. Coupling coefficients between the $LP_{01}$ of the first single mode fiber 34 and the $LP_{0m}$ modes of the multimode fiber 42 are given by Equation 5.

$$C_m = \frac{\int_0^\infty E_{LP_{01}}(r) E_{0m}(r) r dr}{\int_0^\infty E_{0m}(r) E_{0m}(r) r dr} \quad (5)$$

In Equation 5, $E_{LP01}$ and $E_{0m}$ are the radial intensities of the $LP_{01}$ and the $LP_{0m}$ modes in the first single mode fiber 34 and the multimode fiber 42, respectively. The sensitivity of the optical fiber sensor 30 is enhanced when there is a relatively strong coupling from the $LP_{01}$ mode of the first single mode fiber 34 into the higher order $LP_{0m}$ modes of the multimode fiber 42, where m is greater than 1.

Figure 3A:
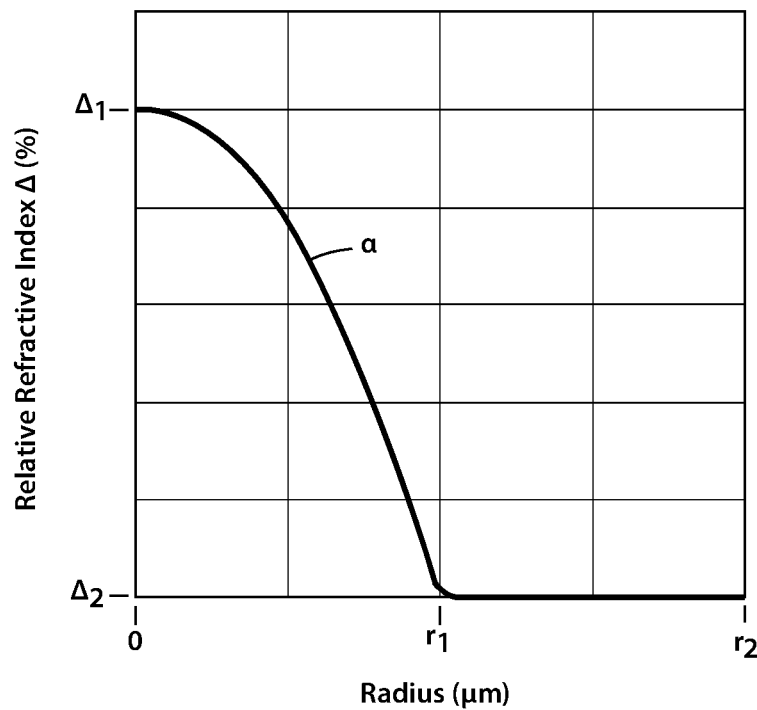
FIG. 3A is a plot of relative refractive index versus radius for a multimode fiber, according to one embodiment.
Figure 3B:
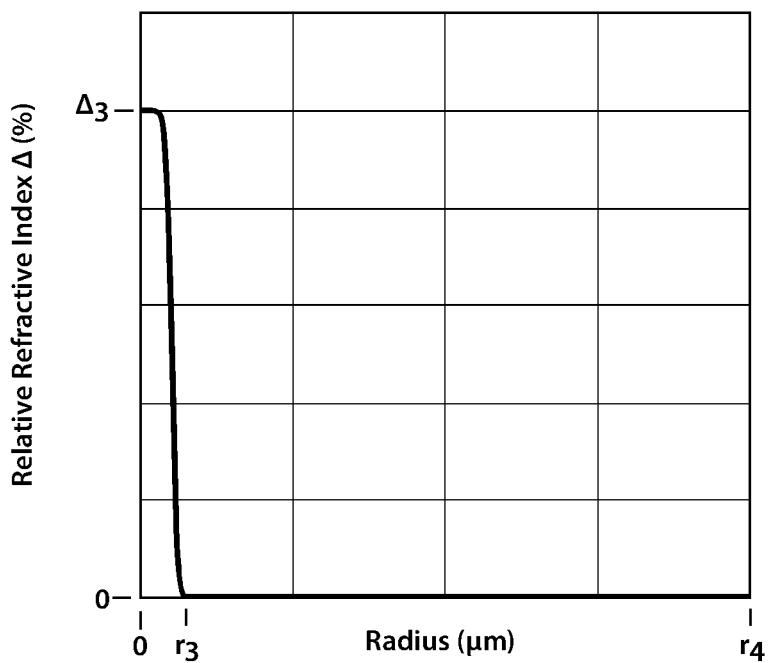
FIG. 3B is a plot of relative refractive index versus radius for a single mode fiber, according to one embodiment.

Referring to FIGS. 3A and 3B, plots of relative refractive index, Δ %, versus radius, r, are shown for the multimode fiber 42 and a single mode fiber (e.g., the first single mode fiber 34 and/or the second single mode fiber 38), according to some examples. Relative refractive index is measured relative to pure silica glass. FIG. 3A shows the refractive index profile of the multimode fiber 42, according to one non-limiting example, that includes a graded-index core with an outer radius, $r_1$, a maximum relative refractive index, $\Delta_1$, and a curvature parameter, α. The cladding 22 extends from the radial position, $r_1$, to a radial position, $r_2$, and has a relative refractive index, $\Delta_2$. The fiber 10 of FIG. 3A includes the coating 26, however, only the glass section of the fiber 10 is shown in the profile. FIG. 3B is similar to FIG. 3A and shows the refractive index profile of a single mode fiber, such as the first single mode fiber 34 and/or the second single mode fiber 38, according to one non-limiting example. The refractive index profile is a step-index profile with an outer radius, $r_3$, and a maximum refractive index, $\Delta_3$. The cladding 22 extends from the radial position, $r_3$, to a radial position, $r_4$. The fiber 10 of FIG. 3B includes the coating 26, however, only the glass section of the fiber 10 is shown in the profile.

With specific reference to FIGS. 4A-4D, plots comparing an electric field (E-Field) for the multimode fiber 42 (left vertical axis in FIGS. 4A and 4B), an electric field of a first example single mode fiber (right vertical axis in FIG. 4A), and an electric field of a second example single mode fiber (right vertical axis in FIG. 4B) are shown as a function of a radial position within the fiber 10. An amplitude of the electric field for the $LP_{01}$, $LP_{02}$, and $LP_{03}$ modes of the multimode fiber 42 are plotted as MMF-$LP_{01}$, MMF-$LP_{02}$, and MMF-$LP_{03}$, respectively. An amplitude of the $LP_{01}$ mode of the first example single mode fiber is plotted as SMF1-$LP_{01}$ in FIG. 4A. An amplitude of the $LP_{01}$ mode of the second example single mode fiber is plotted as SMF2-$LP_{01}$ in FIG. 4B. The electric fields for all fibers were calculated at 1550 nm. The diameter of the cores for the first and second example single mode fibers may be about 3.0 µm, about 3.5 µm, about 4.0 µm, about 4.5 µm, about 5.0 µm, about 5.5 µm, about 6.0 µm, about 6.5 µm, about 7.0 µm, about 8.0 µm, about 8.5 µm, about 9.0 µm, about 9.5 µm, and/or combinations or ranges thereof. These values are exemplary in nature and are not intended to limit the present disclosure and it is intended that the diameter of the cores of the first and second example single mode fibers may be values between those specifically recited. For example, the diameter of the core of the first single mode fiber may be about 9.2 µm and the diameter of the core of the second single mode fiber may be about 5.4 µm.

Figure 4A:
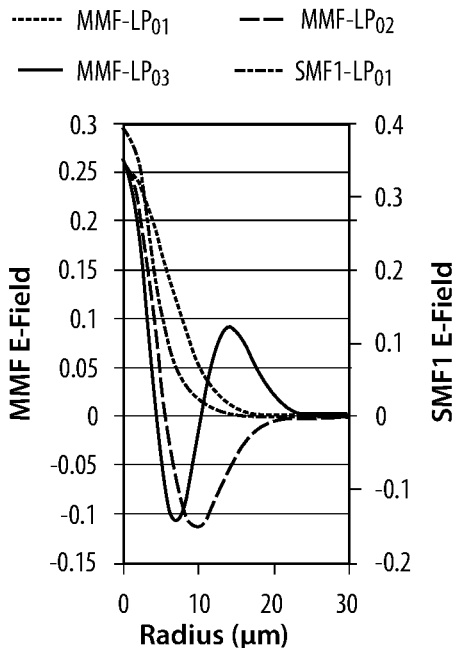
FIG. 4A is a plot depicting electric fields for various modes of a first example single mode fiber and a multimode fiber.
Figure 4B:
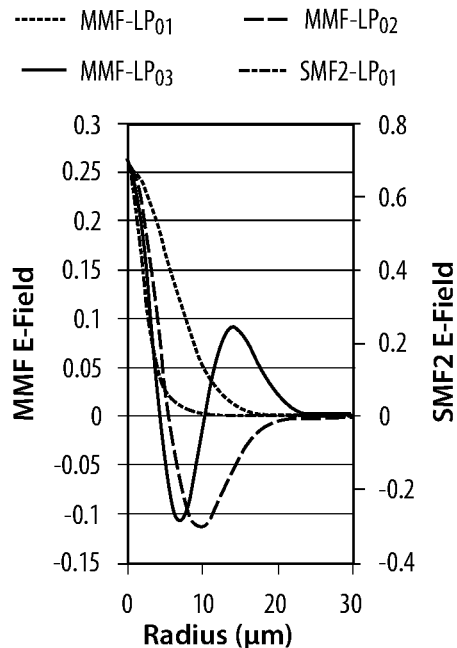
FIG. 4B is a plot depicting electric fields for various modes of a second example single mode fiber and the multimode fiber.
Figure 4C:
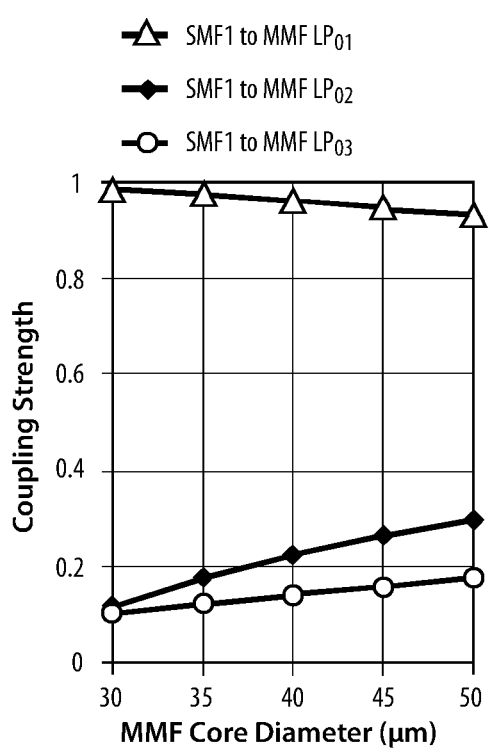
FIG. 4C is a plot depicting a coupling strength between a fundamental mode of the first example single mode fiber and various modes of the multimode fiber.
Figure 4D:
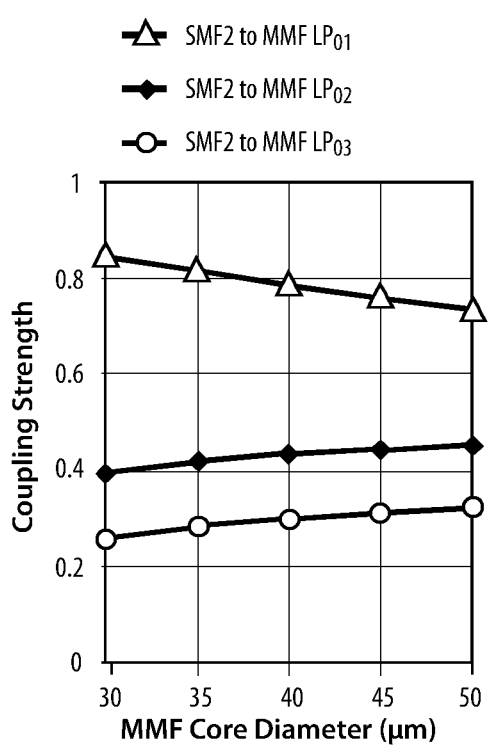
FIG. 4D is a plot depicting a coupling strength between a fundamental mode of the second example single mode fiber and various modes of the multimode fiber.

Referring again to FIGS. 4A-4D, the $LP_{01}$ mode of the first example single mode fiber has a slightly smaller diameter than the $LP_{01}$ mode of the multimode fiber 42. The $LP_{01}$ mode of the first example single mode fiber overlaps regions of positive and negative amplitude of the $LP_{02}$ and $LP_{03}$ modes of the multimode fiber 42, as can be seen in FIG. 4A. As shown in FIG. 4C, Equation 5 can be used to show that the coupling strength from the $LP_{01}$ mode of the first example single mode fiber into the $LP_{01}$ mode of the multimode fiber 42 is greater than about 0.90, but the coupling strengths from the $LP_{01}$ mode of the first example single mode fiber into the $LP_{02}$ and $LP_{03}$ modes of the multimode fiber 42 are less than about 0.30 and less than about 0.20, respectively. In contrast, and as shown by FIG. 4D, the $LP_{01}$ mode of the second example single mode fiber is closely matched to the central positive lobe of the $LP_{02}$ and $LP_{03}$ modes of the multimode fiber 42, resulting in coupling strengths from the $LP_{01}$ mode of the second example single mode fiber into the $LP_{02}$ and $LP_{03}$ modes of the multimode fiber 42 that are both greater than about 0.30, while also reducing the coupling strength from the $LP_{01}$ mode of the second example single mode fiber into the $LP_{01}$ mode of the multimode fiber 42 to less than about 0.85. Increasing the coupling strength from the $LP_{01}$ mode of the second example single mode fiber into the $LP_{02}$ and $LP_{03}$ modes of the multimode fiber 42 and reducing the coupling strength from the $LP_{01}$ mode of the second example single mode fiber into the $LP_{01}$ mode of the multimode fiber 42 each result in a positive impact on the efficiency of the optical fiber sensor 30 with regard to increasing the amplitude, $2\sqrt{I_1 I_2}$, of the interference term in Equation 2.

With specific reference to FIGS. 4C and 4D, a coupling strength of the $LP_{01}$ mode of the first example single mode fiber into the $LP_{01}$, $LP_{02}$, and $LP_{03}$ modes of the multimode fiber 42 (see FIG. 4C) and a coupling strength of the $LP_{01}$ mode of the second example single mode fiber into the $LP_{01}$, $LP_{02}$, and $LP_{03}$ modes of the multimode fiber 42 (see FIG. 4D) are shown for comparative purposes. In both examples, the multimode fiber 42 is provided with a numerical aperture of about 0.20 and a core diameter that ranges from about 30 µm to about 50 µm. When the first example single mode fiber is used as the input fiber for the multimode fiber 42, there is a stronger dependence on the core diameter of the multimode fiber 42. However, when the second example single mode fiber is utilized as the input fiber for the multimode fiber 42, the coupling strength does not have as strong of a dependence on the core diameter of the multimode fiber 42 for coupling into the $LP_{02}$ and $LP_{03}$ modes of the multimode fiber 42. For example, when the second example single mode fiber is utilized, a coupling strength into the $LP_{02}$ and $LP_{03}$ modes of the multimode fiber 42 from the $LP_{01}$ mode of the second example single mode fiber does not significantly decrease when the multimode fiber 42 core diameter is decreased from 50 µm to 40 µm. The data presented in FIGS. 4C and 4D indicate that using the second example single mode fiber as an input and output fiber on either side of a multimode fiber 42 with a reduced core diameter of, for example, 40 µm, in the optical fiber sensor 30 provides superior coupling from the $LP_{01}$ mode of the input fiber into the higher order modes of the multimode fiber 42. Additionally, it is contemplated that the second example single mode fiber may be utilized with a reduced cladding diameter to simplify splicing into the multimode fiber 42. For example, the cladding diameter of the multimode fiber 42 may be reduced to about 80 µm in an effort to enhance the microbend sensitivity and the second example single mode fiber may similarly be provided with a reduced cladding diameter of about 80 µm.

In various examples of the foregoing aspects, the coupling strength of the $LP_{01}$ mode of the first single mode fiber 34 to the $LP_{02}$ mode of the multimode fiber 42 can be at least about 0.20, at least about 0.25, at least about 0.30, at least about 0.35, at least about 0.40, at least about 0.45, and/or combinations or ranges thereof. The coupling strength of the $LP_{01}$ mode of the first single mode fiber 34 to the $LP_{03}$ mode of the multimode fiber 42 can be at least about 0.20, at least about 0.24, at least about 0.28, at least about 0.32, and/or combinations or ranges thereof. A coupling strength of an $LP_{01}$ mode of the second single mode fiber 38 to the $LP_{02}$ mode of the multimode fiber 42 can be at least about 0.30, at least about 0.35, at least about 0.40, at least about 0.45, and/or combinations or ranges thereof. The coupling strength of the $LP_{01}$ mode of the first single mode fiber 34 to the $LP_{03}$ mode of the multimode fiber 42 can be at least about 0.20, at least about 0.25, at least about 0.30, and/or combinations or ranges thereof. The coupling strength of the $LP_{01}$ mode of the first single mode fiber 34 to an $LP_{01}$ mode of the multimode fiber 42 can be less than about 1.00, less than about 0.95, less than about 0.90, less than about 0.85, less than about 0.80, less than about 0.75, and/or combinations or ranges thereof. The core of the first single mode fiber 34 can have an outer diameter of about 3 µm, about 4 µm, about 6 µm, about 8 µm, about 9 µm, and/or combinations or ranges thereof. The core of the first single mode fiber 34 can have a maximum relative refractive index of about 0.3%, about 0.4%, about 0.6%, about 0.8%, about 1.0%, about 1.2%, about 1.4%, about 1.6%, and/or combinations or ranges thereof. A diameter of the cladding 22 on the first single mode fiber 34 can be about 50 µm, about 60 µm, about 70 µm, about 80 µm, about 90 µm, about 100 µm, and/or combinations or ranges thereof. The core of the second single mode fiber 38 can have an outer diameter of about 2 µm, about 4 µm, about 6 µm, about 8 µm, about 10 µm, about 12 µm, and/or combinations or ranges thereof. The core of the second single mode fiber 38 can have a maximum relative refractive index of about 0.3%, about 0.4%, about 0.6%, about 0.8%, about 1.0%, about 1.2%, about 1.4%, about 1.6%, and/or combinations or ranges thereof. A diameter of the cladding 22 on the second single mode fiber 38 can be about 50 µm, about 60 µm, about 70 µm, about 80 µm, about 90 µm, about 100 µm, and/or combinations or ranges thereof.

Provided herein is an optical fiber sensor 30 that has a multimode fiber 42 with enhanced microbend sensitivity. Additionally, the input and output fibers that are coupled to either end of the multimode fiber 42 are configured to improve coupling between the higher order modes of the multimode fiber 42 and the fundamental mode of the input and output fibers. The resultant optical fiber sensor 30 is capable of greater spatial resolution and sensitivity to environmental perturbations.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. An optical fiber sensor, comprising:
a first single mode fiber comprising a core and a cladding;
a second single mode fiber comprising a core and a cladding; and
a multimode fiber positioned between, and coupled to, the first single mode fiber and the second single mode fiber, the multimode fiber comprising:
a graded-index core having an outer diameter between about 35 µm and about 45 µm, wherein a numerical aperture of the core is between about 0.15 and about 0.25;
a cladding having an outer radius of about 30 µm to about 40 µm; and
wherein a coupling strength of an $LP_{01}$ mode of the first single mode fiber to each of an $LP_{02}$ mode and an $LP_{03}$ mode of the multimode fiber is at least about 0.25.

2. The optical fiber sensor of claim 1, wherein the coupling strength of the $LP_{01}$ mode of the first single mode fiber to the $LP_{02}$ mode of the multimode fiber is at least about 0.35.

3. The optical fiber sensor of claim 2, wherein the coupling strength of the $LP_{01}$ mode of the first single mode fiber to the $LP_{03}$ mode of the multimode fiber is at least about 0.28.

4. The optical fiber sensor of claim 3, wherein the $LP_{02}$ and the $LP_{03}$ modes of the multimode fiber coherently interfere as light propagates through the multimode fiber.

5. The optical fiber sensor of claim 2, wherein a coupling strength of an $LP_{01}$ mode of the second single mode fiber to the $LP_{02}$ mode of the multimode fiber is at least about 0.40.

6. The optical fiber sensor of claim 5, wherein the coupling strength of the $LP_{01}$ mode of the first single mode fiber to the $LP_{03}$ mode of the multimode fiber is at least about 0.30.

7. The optical fiber sensor of claim 1, wherein the coupling strength of the $LP_{01}$ mode of the first single mode fiber to an $LP_{01}$ mode of the multimode fiber is less than about 0.90.

8. The optical fiber sensor of claim 7, wherein the coupling strength of the $LP_{01}$ mode of the first single mode fiber to the $LP_{03}$ mode of the multimode fiber is at least about 0.30.

9. The optical fiber sensor of claim 1, wherein the core of the first single mode fiber has an outer diameter between about 4 µm and about 8 µm a maximum relative refractive index between about 0.4% and about 1.2%, and a cladding diameter of the first single mode fiber is between about 70 µm and about 90 µm.

10. The optical fiber sensor of claim 9, wherein the core of the second single mode fiber has an outer diameter between about 4 µm and about 8 µm a maximum relative refractive index between about 0.4% and about 1.2%, and a cladding diameter of the second single mode fiber is between about 70 µm and about 90 µm.

11. An optical fiber sensor, comprising:
a first single mode fiber comprising a core and a cladding;
a second single mode fiber comprising a core and a cladding; and
a multimode fiber positioned between, and coupled to, the first single mode fiber and the second single mode fiber, the multimode fiber comprising:
a graded-index core having an outer radius of about 20 µm, wherein a numerical aperture of the core is about 0.20;
a cladding having an outer radius of about 40 µm; and
wherein an $LP_{01}$ mode of the first single mode fiber is closely matched to a central positive lobe of an $LP_{02}$ mode of the multimode fiber such that a coupling strength of the $LP_{01}$ mode of the first single mode fiber to each of an $LP_{02}$ mode and an $LP_{03}$ mode of the multimode fiber is at least about 0.25.

12. The optical fiber sensor of claim 11, wherein the coupling strength of the $LP_{01}$ mode of the first single mode fiber to the $LP_{02}$ mode of the multimode fiber is at least about 0.35.

13. The optical fiber sensor of claim 12, wherein the coupling strength of the $LP_{01}$ mode of the first single mode fiber to the $LP_{03}$ mode of the multimode fiber is at least about 0.28.

14. The optical fiber sensor of claim 13, wherein the $LP_{02}$ and the $LP_{03}$ modes of the multimode fiber coherently interfere as light propagates through the multimode fiber.

15. The optical fiber sensor of claim 12, wherein the coupling strength of the $LP_{01}$ mode of the first single mode fiber to the $LP_{02}$ mode of the multimode fiber is at least about 0.40.

16. The optical fiber sensor of claim 15, wherein the coupling strength of the $LP_{01}$ mode of the first single mode fiber to the $LP_{03}$ mode of the multimode fiber is at least about 0.30.

17. The optical fiber sensor of claim 11, wherein the coupling strength of the $LP_{01}$ mode of the first single mode fiber to an $LP_{01}$ mode of the multimode fiber is less than about 0.90.

18. The optical fiber sensor of claim 11, wherein the coupling strength of the $LP_{01}$ mode of the first single mode fiber to an $LP_{01}$ mode of the multimode fiber is less than about 0.85.

19. The optical fiber sensor of claim 13, wherein the core of the first single mode fiber has a core having an outer diameter between about 4 µm and about 8 µm and a maximum relative refractive index between about 0.4% and about 1.2%, and a cladding diameter of the first single mode fiber is between about 70 µm and about 90 µm.

20. The optical fiber sensor of claim 19, wherein the core of the second single mode fiber has a core having an outer diameter between about 4 μm and about 8 μm and a maximum relative refractive index between about 0.4% and about 1.2%, and a cladding diameter of the second single mode fiber is between about 70 μm and about 90 μm.

\* \* \* \* \*

UNITED STATES PATENT AND TRADEMARK OFFICE
CERTIFICATE OF CORRECTION

PATENT NO. : 10,837,804 B2
APPLICATION NO. : 16/432213
DATED : November 17, 2020
INVENTOR(S) : Scott Robertson Bickham Page 1 of 1

It is certified that error appears in the above-identified patent and that said Letters Patent is hereby corrected as shown below:

On the Title Page

On page 2, in Column 2, item (56), Other Publications, Line 13, delete "Mulitmode" and insert -- Multimode --, therefor.

Signed and Sealed this
Eighth Day of August, 2023

Katherine Kelly Vidal
*Director of the United States Patent and Trademark Office*